United States Patent
Oniki

(10) Patent No.: US 11,830,173 B2
(45) Date of Patent: Nov. 28, 2023

(54) MANUFACTURING METHOD OF LEARNING DATA, LEARNING METHOD, LEARNING DATA MANUFACTURING APPARATUS, LEARNING APPARATUS, AND MEMORY MEDIUM

(71) Applicant: CANON KABUSHIKI KAISHA, Tokyo (JP)

(72) Inventor: Takashi Oniki, Tochigi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 154 days.

(21) Appl. No.: 17/193,429

(22) Filed: Mar. 5, 2021

(65) Prior Publication Data

US 2021/0279851 A1    Sep. 9, 2021

(30) Foreign Application Priority Data

Mar. 9, 2020 (JP) ................ 2020-040026
Jan. 14, 2021 (JP) ................ 2021-003864

(51) Int. Cl.
*G06K 9/00* (2022.01)
*G06T 7/00* (2017.01)
*G06T 11/00* (2006.01)

(52) U.S. Cl.
CPC ............ *G06T 7/0002* (2013.01); *G06T 11/00* (2013.01); *G06T 2207/20081* (2013.01); *G06T 2207/20084* (2013.01); *G06T 2207/30168* (2013.01)

(58) Field of Classification Search
CPC .............. G06T 7/0002; G06T 11/00; G06T 2207/20081; G06T 2207/20084; G06T 2207/30168

USPC ....................................... 382/157
See application file for complete search history.

(56) References Cited

U.S. PATENT DOCUMENTS 10,922,799 B2    2/2021  Hiasa
2017/0308770 A1*  10/2017  Jetley ............. G06V 10/82
2019/0026864 A1*  1/2019  Chen ............... G06T 3/4053
(Continued)

FOREIGN PATENT DOCUMENTS

EP    3786879 A1    3/2021
JP    2019121252 A    7/2019
(Continued)

OTHER PUBLICATIONS

Fridman, Lex, et al. "Sideeye: A generative neural network based simulator of human peripheral vision." arXiv preprint arXiv:1706.04568 (2017). (Year: 2017).*

(Continued)

*Primary Examiner* — Jonathan S Lee
(74) *Attorney, Agent, or Firm* — ROSSI, KIMMS & McDOWELL LLP

(57) ABSTRACT

A manufacturing method of learning data is used for making a neural network perform learning. The manufacturing method of learning data includes a first acquiring step configured to acquire an original image, a second acquiring step configured to acquire a first image as a training image generated by adding blur to the original image, and a third acquiring step configured to acquire a second image as a ground truth image generated by adding blur to the original image. A blur amount added to the second image is smaller than that added to the first image.

16 Claims, 12 Drawing Sheets

(56) References Cited

U.S. PATENT DOCUMENTS

2020/0065942 A1    2/2020   Hiasa

FOREIGN PATENT DOCUMENTS

JP        2020030569 A    2/2020
JP        2020-036310 A   3/2020

OTHER PUBLICATIONS

Burt, Ryan, et al. "Unsupervised Foveal Vision Neural Networks with Top-Down Attention." arXiv preprint arXiv:2010.09103 (2020). (Year: 2020).*

Mao "Image Restoration Using Convolutional Auto-encoders with Symmetric Skip Connections" arXiv:1606.08921v3 [cs.CV]. Aug. 30, 2016: pp. 1-17. Cited in the specification.

Extended European search report issued in European Appln. No. 21160534.0 dated Aug. 6, 2021.

Office Action issued in Japanese Appln. No. 2021-003864 dated Jun. 20, 2023. English translation provided.

* cited by examiner

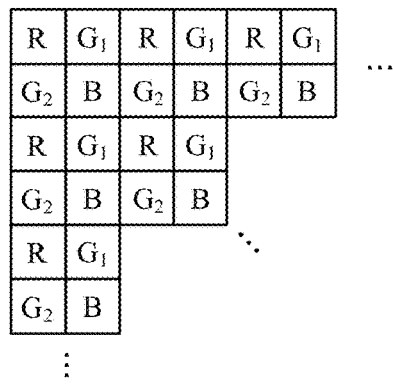
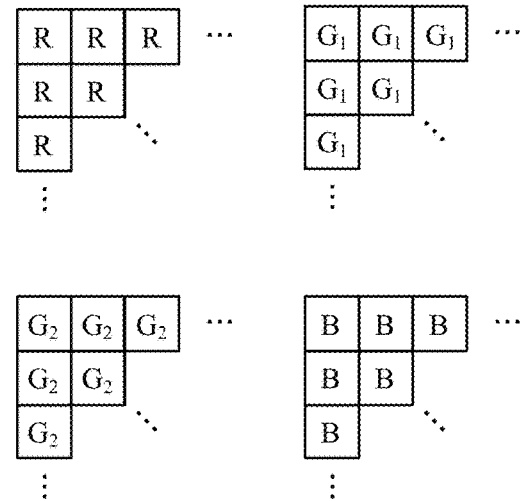
FIG. 8A                    FIG. 8B
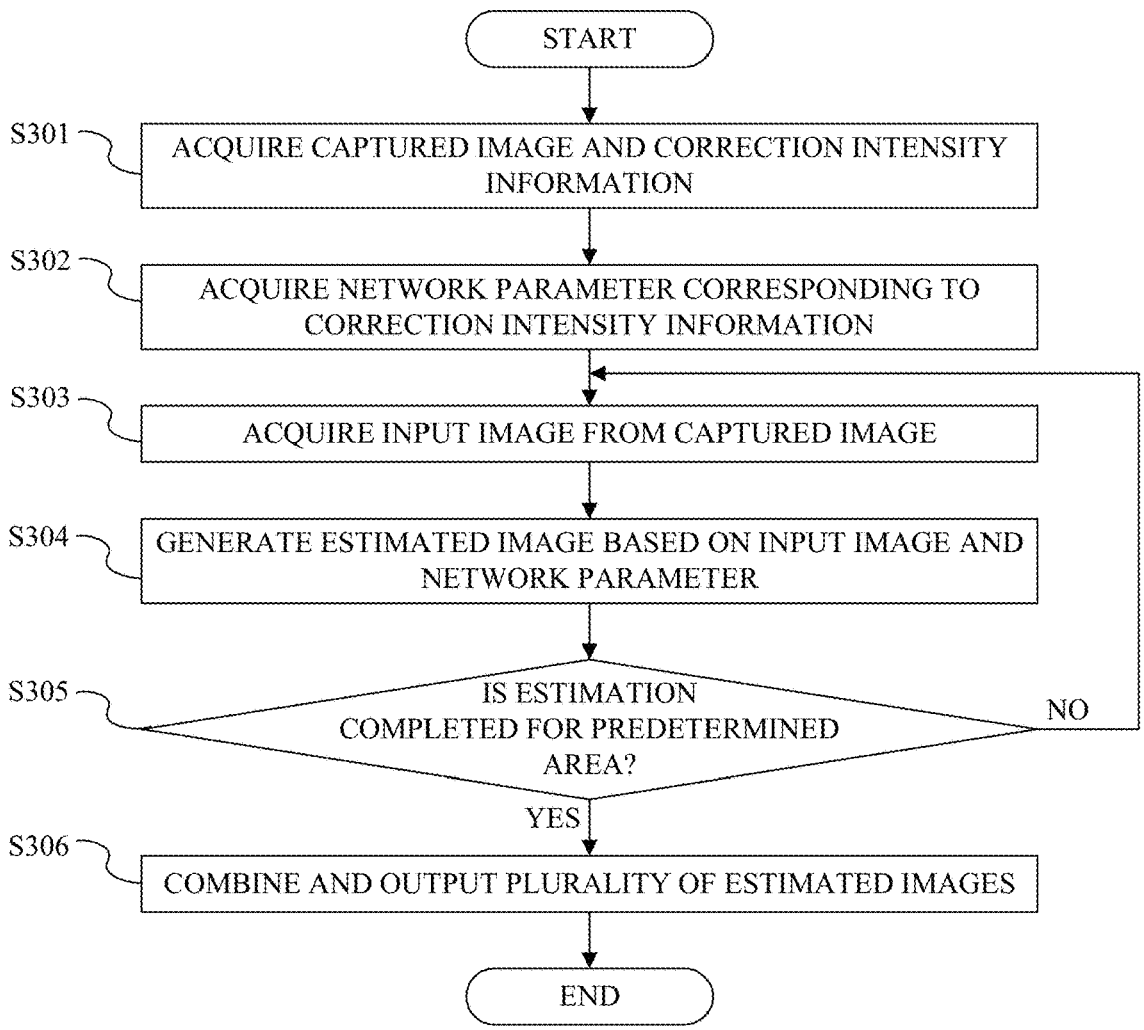
FIG. 9

MANUFACTURING METHOD OF LEARNING DATA, LEARNING METHOD, LEARNING DATA MANUFACTURING APPARATUS, LEARNING APPARATUS, AND MEMORY MEDIUM

BACKGROUND OF THE INVENTION

Field of the Invention

The present invention relates to a manufacturing method of learning data used for deep learning and a learning method using deep learning.

Description of the Related Art

Japanese Patent Laid-Open No. ("JP") 2019-121252 discloses a method of suppressing undershoot and ringing each of which is caused by increasing resolution or contrast (sharpening), by taking account of an effect of gamma correction when making a multi-layer neural network perform learning that uses a RAW image as an input. X. Mao, C. Shen, Y. Yang, "Image Restoration Using Convolutional Auto-encoders with Symmetric Skip Connections", https://arxiv.org/abs/1606.08921. (hereinafter referred to as Mao et. al.) discloses a network configuration that is universally applicable to various regression problems. Mao et. al. further discloses to perform upsampling, JPEG deblocking (removal of compression noise), denoising, non-blind deblurring, or inpainting on an input image, by using a network.

However, the methods disclosed in JP 2019-121252 and Mao et. al. may not suppress undershoot, ringing, etc. depending on an input image, and these side effects may occur in a corrected image (estimated image). Specifically, when the input image includes an object of high luminance, when the input image includes an object which is greatly blurred due to an aberration of an optical system, or especially when the input image includes an object with a high luminance value and the luminance is saturated, those side effects are likely to occur. When such images are used as learning data, the side effects such as undershoot and ringing may occur depending on the correction amount.

SUMMARY OF THE INVENTION

The present invention provides a manufacturing method of learning data and the like each of which can realize highly accurate correction while reducing a possibility of an occurrence of a side effect even when an image input to a neural network includes an object of high luminance or an object that is greatly blurred due to an aberration of an optical system.

A manufacturing method of learning data as one aspect of the present invention is used for making a neural network perform learning. The manufacturing method of learning data includes a first acquiring step configured to acquire an original image, a second acquiring step configured to acquire a first image as a training image generated by adding blur to the original image, and a third acquiring step configured to acquire a second image as a ground truth image generated by adding blur to the original image. A blur amount added to the second image is smaller than that added to the first image.

A learning method as another aspect of the present invention makes a neural network perform learning using learning data generated by the above manufacturing method of learning data. The learning method includes steps of generating a processed image by inputting the first image as the training image into the neural network, and updating the neural network based on the second image and the processed image.

A learning data manufacturing apparatus as another aspect of the present invention manufactures learning data used for learning of a neural network. The learning data manufacturing apparatus includes at least one processor or circuit configured to execute a plurality of tasks including a first acquisition task configured to acquire an original image, a second acquisition task configured to acquire a first image generated by adding blur to the original image, and a third acquisition task configured to acquire a second image generated by adding blur to the original image. A blur amount added to the second image is smaller than that of the first image.

A learning apparatus as another aspect of the present invention includes the above learning data manufacturing apparatus, and at least one processor or circuit configured to execute a plurality of tasks including a generation task configured to generate a processed image by inputting the first image as the training image to a neural network, and an update task configured to update the neural network based on the second image and the processed image.

A manufacturing method of learnt model as another aspect of the present invention manufactures a learnt model by making a neural network perform learning using learning data generated by the above manufacturing method of learning data. The manufacturing method of learnt model includes steps of generating a processed image by inputting the first image as the training image into the neural network and making the neural network perform learning based on the second image and the processed image.

Further features of the present invention will become apparent from the following description of exemplary embodiments with reference to the attached drawings.

BRIEF DESCRIPTION OF THE DRAWINGS

FIGS. 8A and 8B are exploratory diagrams relating to color components of an image according to each embodiment.

FIG. 9 is a flowchart illustrating an estimation phase according to the first and second embodiments.

DESCRIPTION OF THE EMBODIMENTS

Figure 1:
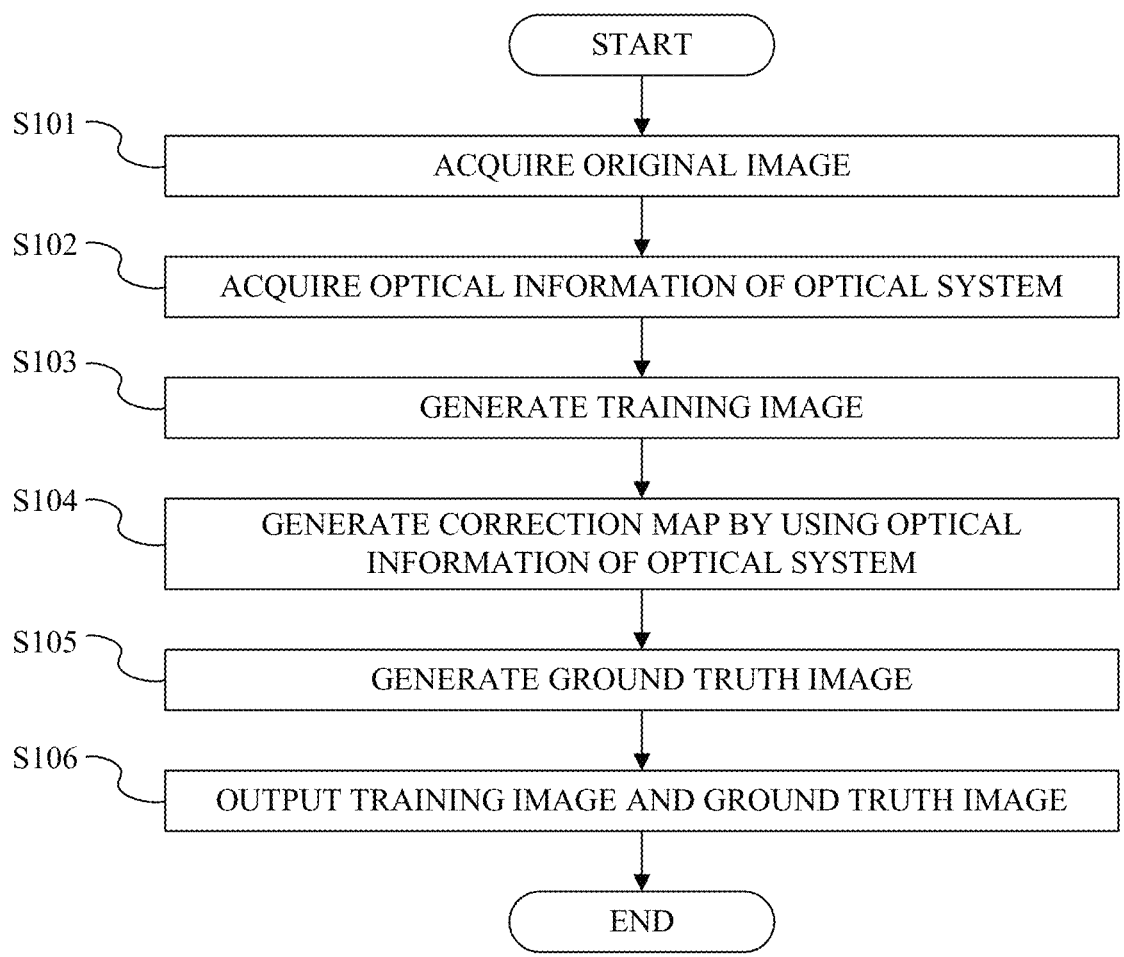
FIG. 1 is a flowchart illustrating a manufacturing method of learning data according to a first embodiment.

Referring now to the accompanying drawings, a description will be given of embodiments of the present invention. Corresponding elements in respective figures will be designated by the same reference numerals, and a description thereof will be omitted.

First, a definition will be given of each term used in each embodiment. Each embodiment relates to a method of solving a regression problem by deep learning and of estimating various output images from an input image. The deep learning is machine learning using a multilayer neural network. When network parameters (weight and bias) are learnt from a large number of pairs of a training image and a corresponding ground truth image (desired output), it is possible to perform highly accurate estimation even for an unknown input image.

Image processing using the multilayer neural network includes two phases which are a processing phase for updating the network parameters (weight and bias), and a processing phase for perform estimation on unknown input using updated parameters. Hereinafter, the former phase will be referred to as a learning phase, and the latter phase will be referred to as an estimation phase.

Next, names are defined of images in the learning phase and the estimation phase. An image input to the network will be referred to as an input image, and in particular, an input image, of which a ground truth image is known and which is used during the learning phase, will be referred to as a training image. An image output from the network will be referred to as an output image, and in particular, an output image during the estimation phase will be referred to as an estimated image. The input image to the network and the ground truth image are RAW images. A RAW image is undeveloped image data output from an image sensor, and a light amount and signal value of each pixel have a substantially linear relationship. The RAW image is developed before a user views the image, and gamma correction is performed at the time of development. The gamma correction is, for example, processing of raising an input signal value to a power, and 1/2.2 or the like is used as an exponent. In a manufacturing method of learning data (learning image) of each embodiment, an adjusted ground truth image is generated which is used in learning for realizing highly accurate correction while side effects are suppressed. In each embodiment, an image will be referred to as an original image which has substantially no deterioration and is a basis for generating the ground truth image or the training image.

A gist of the present invention will be described before a detailed description of each embodiment. The present invention realizes a neural network that can correct an image including a high-luminance object or an object that is greatly blurred due to an aberration of an optical system while preventing a side effect, and provides learning data necessary for that. Instead of using an original image as it is as a ground truth image of the learning data, the present invention uses an adjusted ground truth image. The adjusted ground truth image is an image in which blur is added to part of the original image where side effects are likely to occur such as a high luminance part, a high contrast part, and an area having a large aberration. Such an adjustment makes sharpness different between the ground truth image and the training image depending on the position of the image. Alternatively, a training image may be generated by sharpening. Any one of the methods can adjust a blur amount (sharpness) of the ground truth image to be an intermediate blur amount between the original image and the training image. Thereby, in the area where side effects are likely to occur, a difference between the ground truth image and the training image can be made smaller than a difference between the original image and the training image. When learning is performed by using the ground truth image and training image each of which is generated in this way, it is possible to generate the learning model which realizes highly accurate correction while reducing the possibility of occurrence of side effects.

First Embodiment

A description will be given of an image processing system of a first embodiment of the present invention. In this embodiment, firstly, learning data is generated that is used for learning by a multilayer neural network. Thereafter, the learning is performed using the generated learning data, and correction processing is executed using a learnt model.

Figure 2:
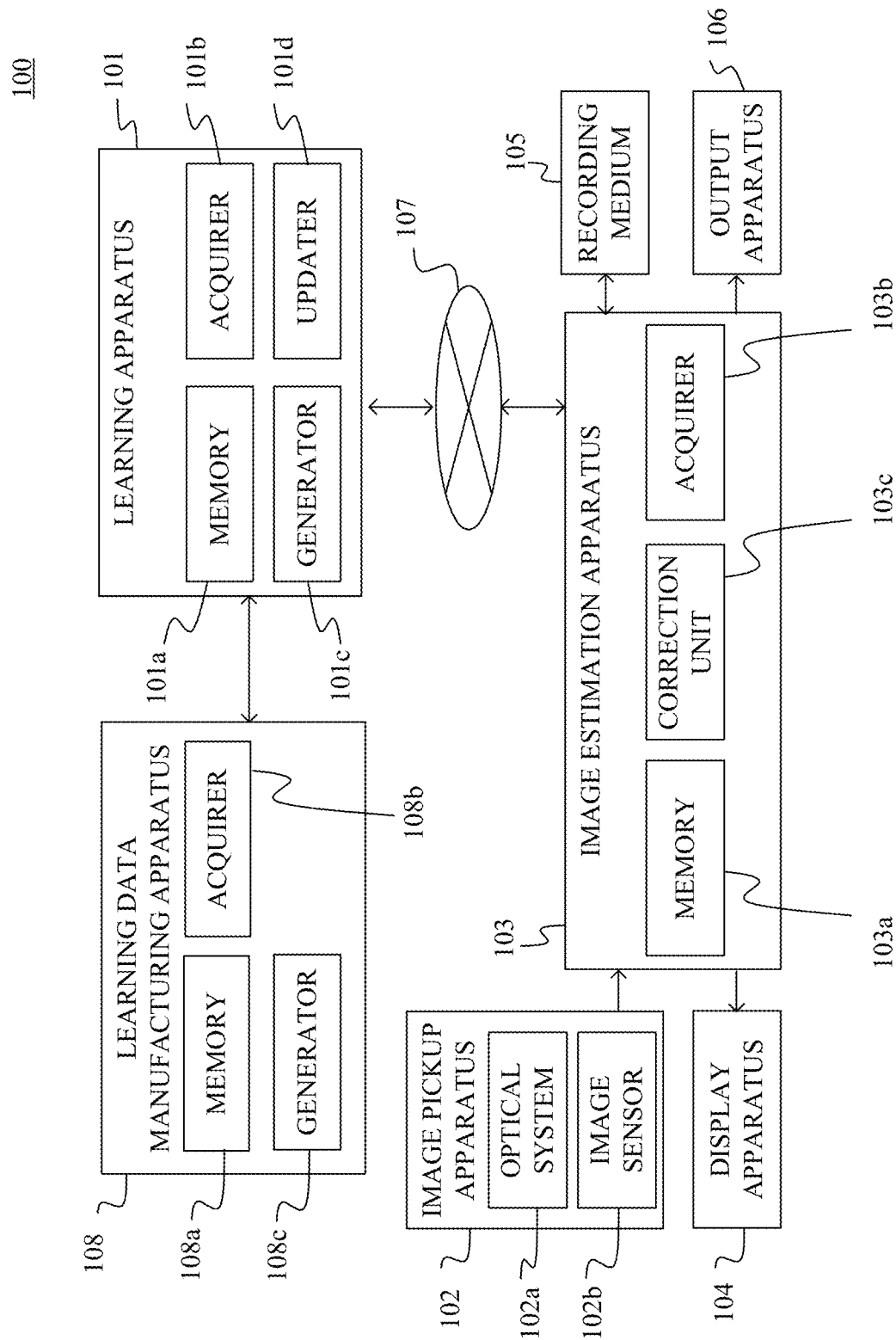
FIG. 2 is a block diagram illustrating an image processing system according to the first and third embodiments.
Figure 3:
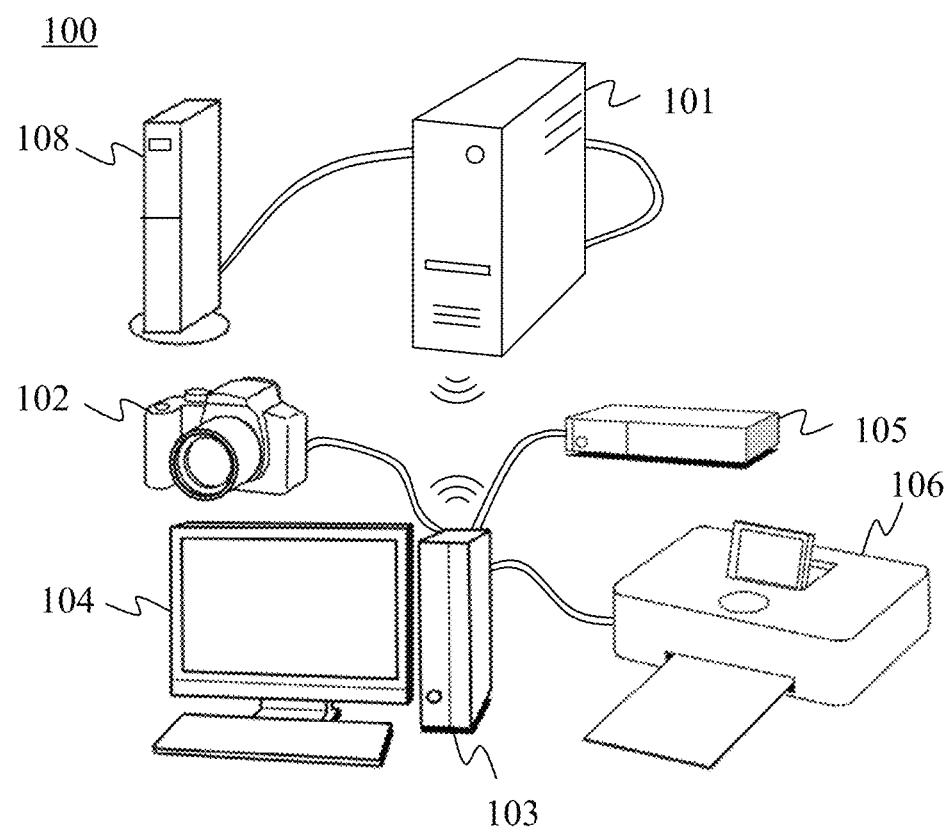
FIG. 3 is an external view illustrating the image processing system according to the first and third embodiments.

FIG. 2 is a block diagram illustrating an image processing system 100 in this embodiment. FIG. 3 is an external view illustrating the image processing system 100. The image processing system 100 includes a learning apparatus (image processing apparatus) 101, an image pickup apparatus 102, an image estimation apparatus (image processing apparatus) 103, a display apparatus 104, a recording medium 105, an output apparatus 106, a network 107, and a learning data manufacturing apparatus (image processing apparatus) 108.

The learning data manufacturing apparatus 108 is an apparatus configured to manufacture learning data used in a learning phase, and includes a memory 108a, an acquirer 108b, and a generator 108c. The acquirer 108b is configured to acquire an original image (third image) and characteristic information on an optical system such as an image height used for generating the learning data. The generator 108c is configured to generate a training image (first image) and a ground truth image (second image) based on the original image. That is, the generator 108c has functions as an acquisition unit for acquiring the training image and a generation unit for generating the ground truth image having an optical characteristic different from that of the training image. The training image and the ground truth image generated by the generator 108c are stored in the memory 108a. A detailed description will be given later regarding the generation of the learning data, with reference to a flowchart of FIG. 1.

The learning apparatus 101 is an image processing apparatus configured to execute the learning phase, and includes a memory 101a, an acquirer 101b, a generator (generation unit) 101c, and an updater (update unit) 101d. The acquirer 101b is configured to acquire the training image and the ground truth image. The generator 101c is configured to input the training image (first image) to the multilayer neural network and to generate an output image (processed image). The updater 101d is configured to update a network parameter of the neural network based on a difference (error) between the output image generated by the generator 101c and the ground truth image. A detailed description will be given later of the learning phase with reference to a flowchart. The learnt network parameter is stored in the memory 101a.

The image pickup apparatus 102 includes an optical system 102a and an image sensor 102b. The optical system 102a is configured to collect light entering the image pickup apparatus 102 from an object space. The image sensor 102b is configured to acquire a captured image by receiving light of, that is, by photoelectrically converting, an optical image (object image) formed via the optical system 102a. The image sensor 102b is, for example, a CCD (Charge Coupled Device) sensor, a CMOS (Complementary Metal-Oxide Semiconductor) sensor, or the like. The captured image acquired by the image pickup apparatus 102 includes blur caused by an aberration or diffraction of the optical system 102a and noise caused by the image sensor 102b.

The image estimation apparatus 103 is an apparatus configured to execute the estimation phase, and includes a memory 103a, an acquirer 103b, and a correction unit (estimation unit) 103c. The image estimation apparatus 103 is configured to acquire the captured image, to perform deblurring (correct blur) while suppressing a side effect, and to generate an estimated image. The multilayer neural network is used for blurring, and information on the network parameter is read from the memory 103a. The network parameter is learnt by the learning apparatus 101. The image estimation apparatus 103 is configured to read the network parameter from the memory 101a via the network 107 in advance and to store the network parameter in the memory 103a. The stored network parameter may be a numerical value itself or may be in encoded form. A detailed description will be given later of the learning of the network parameter and deblurring processing using the network parameter.

The output image is output to at least one of the display apparatus 104, the recording medium 105, and the output apparatus 106. The display apparatus 104 is, for example, a liquid crystal display or a projector. A user can perform editing work and the like while checking the image under processing via the display apparatus 104. The recording medium 105 is, for example, a semiconductor memory, a hard disk, a server on a network, or the like. The output apparatus 106 is a printer or the like. The image estimation apparatus 103 has a function of performing development processing and other image processing as needed.

Next, a description will be given of a manufacturing method of learning data executed by the learning data manufacturing apparatus 108, with reference to FIG. 1. FIG. 1 is a flowchart illustrating the manufacturing method of learning data. Each step of FIG. 1 is executed by each part (memory 108a, acquirer 108b, and generator 108c) of the learning data manufacturing apparatus 108.

First, in step S101 of FIG. 1, the acquirer 108b acquires a plurality of original images (third image) (first acquiring step). The original image may be stored in the memory 108a in advance and acquired from the memory 108a, or may be acquired from an external apparatus (not illustrated). In this embodiment, the original image is an undeveloped RAW image. However, this embodiment is not limited to this, and may be an image after development. The plurality of original image are images including various objects, that is, edges of various strengths and directions, various textures, various gradations, various flat parts, and the like. The original image may be a captured image or may be an image generated by CG (Computer Graphics). The original image may have a signal value higher than a luminance saturation value of the image sensor 102b, because an actual object may be an object having a signal value more than the luminance saturation value when image pickup is performed by the image pickup apparatus 102 under a specific exposure condition.

Subsequently, in step S102, the acquirer 108b acquires optical information of the optical system 102a used for blurring (adding blur to) the original image acquired in step S101 (fourth acquiring step). The optical system 102a causes different aberrations and diffractions depending on a plurality of lens states (states of zoom, diaphragm, and in-focus distance), image height, and azimuth. Thus, it is necessary to add, to each original image, with different blur caused by the aberration or diffraction depending on the lens state, the image height, and the azimuth. In step S102, a PSF (point spread function) is acquired of the optical system 102a, the PSF being used for blurring in the next step S103. At this time, the optical information acquired by the acquirer 108b may be two-dimensional data corresponding to a distribution of the PSF, or may be a set of one-dimensional vectors acquired by decomposing the PSF by singular value decomposition or the like. The PSF may be fitted and approximated by a specific function, and a plurality of pieces of coefficient data acquired at the time of approximation may be acquired as the optical information. In this case, the PSF can be acquired by reconstruction using the acquired coefficient data and an approximation function. In this embodiment, a case will be described where the PSF is used for blurring, but an OTF (optical transfer function) may be used instead of the PSF. In a case where the OTF is acquired as the optical information, the OTF may be acquired as two-dimensional data, a one-dimensional vector, or coefficient data, as in the case where the PSF is acquired.

Figure 4:
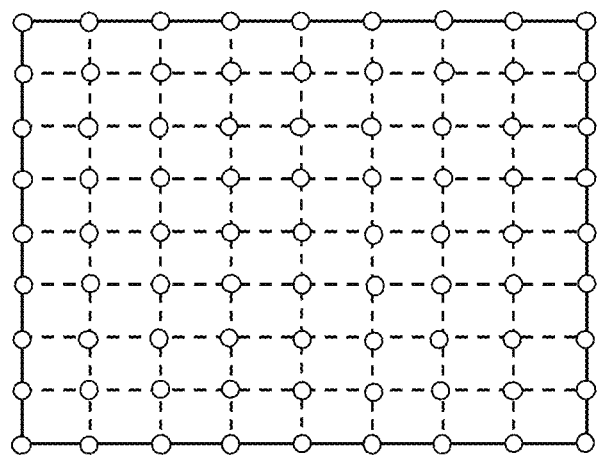
FIG. 4 is an exploratory diagram relating to optical information according to each embodiment.

FIG. 4 illustrates a positional relationship between the original image and the PSF. In FIG. 4, a rectangular frame represents the original image, and white circles represent the positions of the PSFs to be acquired or generated. When the PSF is changed in the original image, the PSF corresponding to each position illustrated in FIG. 4 is acquired or generated. In FIG. 4, the positions of the PSFs are 9×9, but may be reduced for weight reduction or may be increased for high accuracy.

Subsequently, in step S103, the generator 108c generates a training image (first image) by using the optical information acquired in step S102 (second acquiring step). When the acquired optical information is not the PSF but the coefficient data or the like that is the basis of the PSF, the PSF is generated. Thereafter, the generator 108c blurs the original image by using the PSF. In this embodiment, the blurring is performed by convolving the PSF as a blurring filter into the original image. When a degree of blurring is changed based on the image height, the PSF may be changed for each pixel of the original image, and a linear sum of the PSF and a corresponding area of the original image may be calculated for each of all the pixels. For example, when the PSF corresponding to the position illustrated in FIG. 4 is used, in order to acquire a pixel value after blurring of a pixel (pixel of interest) located between the white circles, firstly the PSFs corresponding to four white circles in the vicinity of the pixel is acquired. Thereafter, the four acquired PSFs are interpolated to calculate the PSF corresponding to the pixel of interest, a linear sum of the PSF and the original image is calculated, and the value is assumed to be a value of the pixel of interest after blurring. As the interpolation method, known methods such as bilinear, bicubic, and nearest neighbor may be used.

Next, the blurred original image is reduced. When the original image has a signal value higher than the luminance saturation value of the image sensor 102b, the signal is clipped at the luminance saturation value of the image sensor 102b. In particular, when a captured image is used as the original image, blur has already caused by the aberration or diffraction. Effects of the blur can be reduced by reducing the original image, and thereby an image can be acquired with high resolution (high quality). When the original image includes a sufficient amount of high frequency components, the reduction may not be performed.

Figure 5:
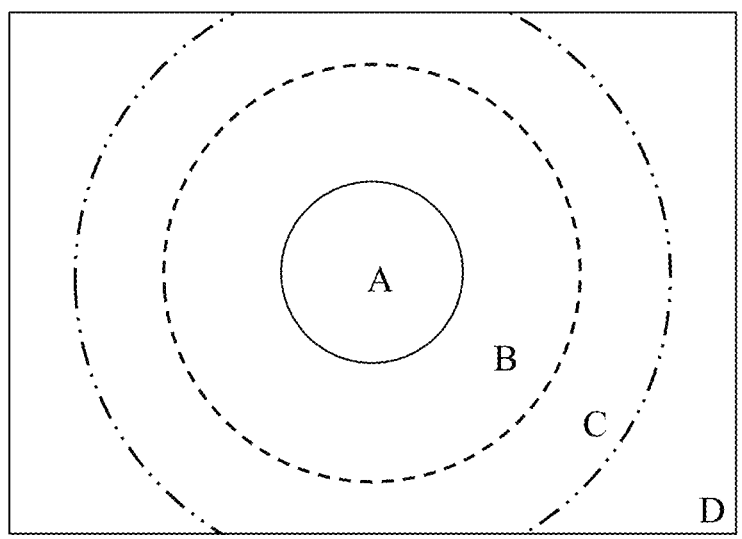
FIG. 5 is an explanatory diagram relating to a correction map according to the first and third embodiments.

Subsequently, in step S104, the generator 108c generates a correction map used for generating a ground truth image. FIG. 5 is a diagram illustrating the correction map in this embodiment. In the correction map of FIG. 5, the original image is divided into four areas of A, B, C, and D based on image heights. In FIG. 5, an area inside a solid line represents an A area, an area surrounded by the solid line and broken line represents a B area, an area surrounded by the broken line and two-dot chain line represents a C area, and an area outside the two-dot chain line represents a D area. In this embodiment, the ground truth image is generated by blurring the original image based on performance of the optical system. Regarding the performance of the optical system used to generate the correction map, any index relating to performance may be used, but this embodiment generates the correction map using the OTF of the optical system.

First, the OTFs at the positions corresponding to the white circles in FIG. 4 are generated by performing Fourier transform on the PSFs corresponding to the white circles. Next, for each OTF, an absolute value is acquired to calculate an MTF (modulation transfer function). Thereafter, an average value is calculated of each MTF up to a Nyquist frequency of the image sensor and the correction map is generated using this value as an index. An index value at a position other than the white circle is acquired by interpolating the index value corresponding to the white circle in the vicinity. Although the index is calculated by using the average MTF up to the Nyquist frequency here, the average MTF may be calculated in different frequency bands, or a specific frequency may be used as the index. The correction map in this embodiment is used to blur the ground truth image, and thus the correction map corresponds to a blurring amount in each pixel.

In FIG. 5, the correction map is divided into four areas based on the image heights, and is divided into these areas based on the values of the average MTFs as the index values. For example, an area having an average MTF of 0.8 or more is the A area, an area having an average MTF of 0.6 or more and less than 0.8 is the B area, an area having an average MTF of 0.4 or more and less than 0.6 is the C area, and an area having an average MTF of less than 0.4 is the D area. When the optical system 102a is a co-axis system, the optical performance is symmetric with respect to the optical axis, and therefore the correction map is also rotationally symmetric as illustrated in FIG. 5. Generally, in an optical system, performance tends to be higher as a position is closer to a center of the image, that is, closer to an optical axis (as an image height is lower), and the performance tends to be lower as a position is closer to a periphery of the image, that is, farther from the optical axis (as the image height is higher). Hence, the correction map is likely to have a distribution as illustrated in FIG. 5. In other words, in the ground truth image, when the image height is a first image height, the sharpness is first sharpness (first blur amount), and when the image height is a second image height higher than the first image height, the sharpness is second sharpness lower than the first sharpness (a second blur amount larger than the first blur amount).

When an optical low-pass filter, a pixel opening of the image sensor 102b, a variation during manufacturing of the optical system 102a, etc. are taken into account, such symmetry is lost, and thus the correction map does not necessarily have circular symmetry. This step calculates the OTF in order to calculate the index, but as long as the index reflects the optical performance, another numerical value may be used as the index. For example, a peak value of the PSF may be used as the index. The peak value of the PSF is an integral value of a real part of the OTF, and thus the peak value is the index correlating with the MTF. Alternatively, the sum of squares of the PSFs may be calculated by using Parseval's theorem, and the average value of the sum of squares of the MTF may be calculated. When the index is calculated directly from the PSF without calculation of the OTF and the correction map is generated in this way, the Fourier transform becomes unnecessary and it is possible to reduce a calculation amount. The correction map in this embodiment is divided into four areas as illustrated in FIG. 5, but the number of areas may be increased or decreased. The index is divided in stages, but the index value as it is may be used as a correction map, or may be used as a continuous value.

Subsequently, in step S105, the generator 108c generates the ground truth image (second image) based on the correction map generated in step S104 (third acquiring step). When blur is corrected (deblurring is performed) by deep learning, the larger a difference between the training image and the ground truth image in the learning data used for learning, the more likely a side effect to occur at the time of estimation. The lower the performance of the optical system 102a in an area, the more largely the training image is blurred in step S103. Therefore, when the original image is used as it is as the ground truth image, the lower the performance of the area, the more different the training image and the ground truth image from each other. This embodiment reduces the possibility of occurrence of the side effect by reducing this difference. In the correction map of FIG. 5, since the area A is an area with high performance, the original image is used as it is without being blurred as the ground truth image corresponding to this area. Thereby, the correction amount can be maintained by maintaining the difference between the training image and the ground truth image for a high-performance area where the side effect is originally unlikely to occur.

Next, regarding the area B, the performance is lower than that of the area A and higher than that of the area C, and thus the original image is slightly added with blur. The ground truth image is generated by, for example, generating a PSF reduced to 30% of the PSF corresponding to each pixel and adding the reduced PSF to the original image. Since the performance of the area C is lower than that of the area B, a blurring amount is further increased. The ground truth image is generated by, for example, by generating a PSF reduced to 60% of the PSF added to the training image and adding the reduced PSF to the original image. Since the performance of the area D is the lowest, the ground truth image is generated by adding, to the original image, the PSF added to the training image without reduction. The reduction amount of the PSF for the correction map is an example, and is not limited to this. The area A is described as an area not to be blurred, but the entire area may be blurred. However, the blurring amount to add to the ground truth image needs to be equal to or less than the blurring amount added when the training image is generated. That is, the training image has lower sharpness (larger blur amount) than that of the ground truth image. Thus, in a case where the ground truth image is blurred, a PSF to be used is equal to or less than the PSF used when the training image is generated.

When the training image is reduced after being blurred during generation of the training image in step S103, the ground truth image is also reduced by the same magnification. At this point, when the original image has a signal value higher than the luminance saturation value of the image sensor 102b, the signal is clipped at the luminance saturation value of the image sensor 102b.

Subsequently, in step S106, the memory 108a stores, as learning data, a pair of the training image generated in step S103 and the ground truth image generated in step S105. The training image and the ground truth image to be generated may be divided and output as a plurality of patches. The patch is an image having a predetermined number of pixels (for example, 64×64 pixels). The number of pixels of ground truth patches and training patches may not necessarily match. When the images are output as the patches, the training image and the ground truth image output through the flowchart of FIG. 1 may be divided, or the original image may be decomposed into each patch in step S101 and thereafter the processing subsequent to step S102 may be proceeded.

As described above, when generating the ground truth image, this embodiment does not simply reduce and output the original image, but blurs, that is lowers the sharpness of, the area where the optical performance of the optical system is low. The blurring may be performed with rotationally symmetric blur such as a Gaussian distribution, or with blur based on deterioration of the optical system. When the PSF of the optical system is used as in this embodiment, the image can be deblurred with higher accuracy.

Figure 6:
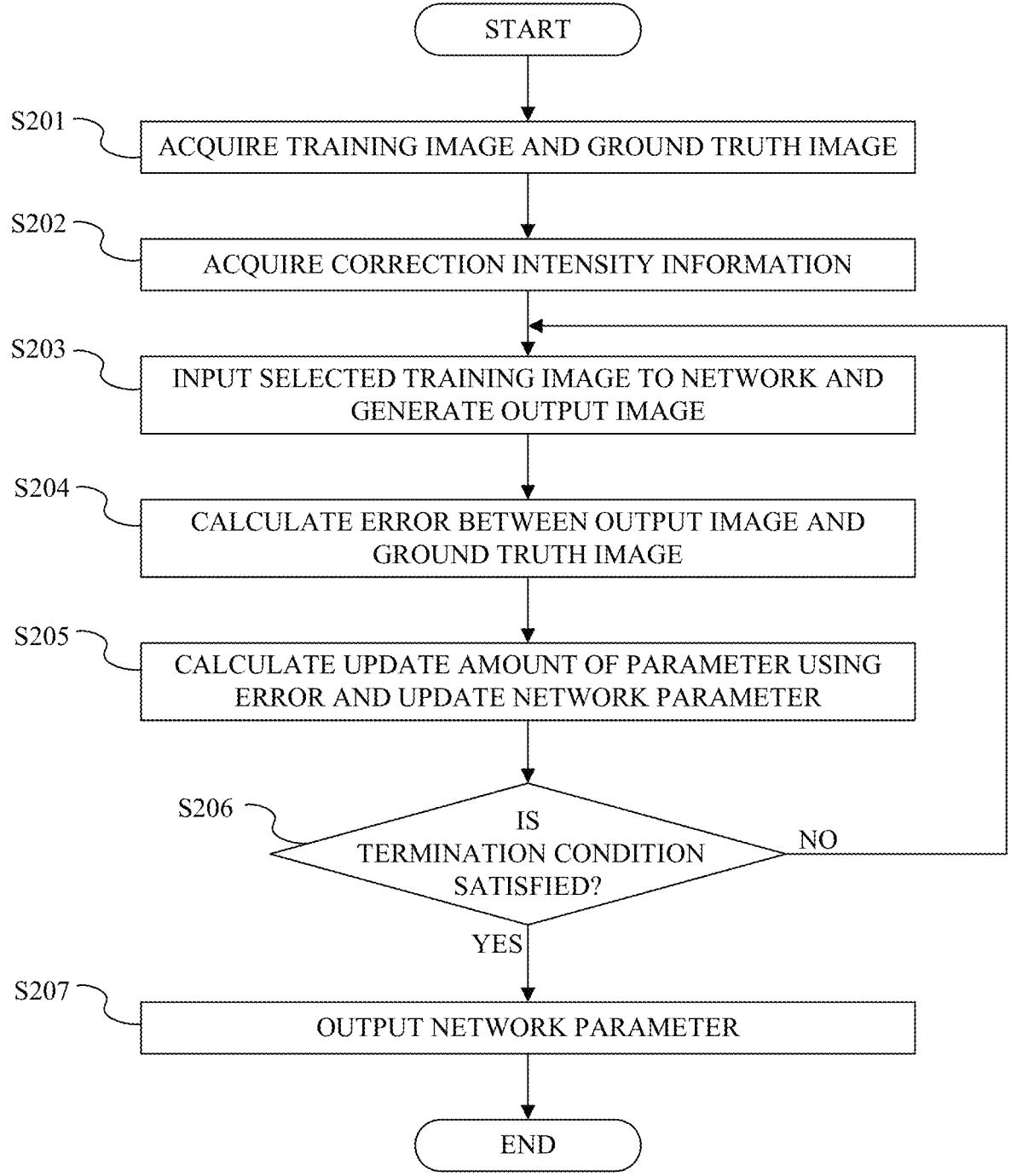
FIG. 6 is a flowchart illustrating a learning phase according to each embodiment.

Next, with reference to FIG. 6, a description will be given regarding a learning method of the network parameter, that is the manufacturing method of the learning model, executed by the learning apparatus 101 in embodiment. FIG. 6 is a flowchart relating to the learning of the network parameter. Each step of FIG. 6 is mainly executed by the acquirer 101b, the generator 101c, or the updater 101d of the learning apparatus 101.

First, in step S201 of FIG. 6, the acquirer 101b acquires a ground truth patch (first ground truth image) and a training patch (first training image). The ground truth patch is an image with relatively less blur, and the training patch is an image with relatively more blur. This embodiment uses mini-batch learning for learning the network parameter by the multilayer neural network. Thus, in step S101, a plurality of sets of ground truth patches and training patches are acquired. However, this embodiment is not limited to this, and online learning or batch learning may be used.

Subsequently, in step S202, the acquirer 101b acquires information on a correction intensity used in the learning phase, the information being hereinafter also referred to as correction intensity information. In this embodiment, the correction intensity information is information associated with the learning data, and makes it possible to control a correction amount during estimation. For example, when two pieces of information, "strong" and "weak", can be set as the correction intensity information at a time of estimation, it is necessary to perform learning using learning data, i.e., the training image and the ground truth image, corresponding to each piece of information and to prepare two types of network parameters. In this embodiment, a description will be given of the case of using these two pieces of information, but the number of settable pieces of information may be increased, or the information may be set as continuous information instead of discrete information.

Subsequently, in step S203, the generator 101c selects at least one training image from the plurality of training images acquired in step S201, inputs the selected training image to the network, and calculate (generate) an output image. The batch learning is a case where all of the plurality of training images are selected, that is, where all of the training images are input to the network and the network parameters are updated by using all output. In this method, as the number of the training images increases, the calculation load greatly increases. The online learning is a case where a single training image is selected, that is, where the single training image is used for updating the network parameter and a different training image is used for each update. In this method, the amount of calculation does not increase even when the total number of the training images increases, but it is easily affected by noise existing in the single training image. Thus, the mini-batch method may be used in which the small number (mini-batch) of training image is selected from the plurality of training images and the network parameters are updated using those. In the next update, a small number of different training image is selected and used. By repeating this processing, weak points of the batch learning and the online learning can be reduced.

Figure 7:
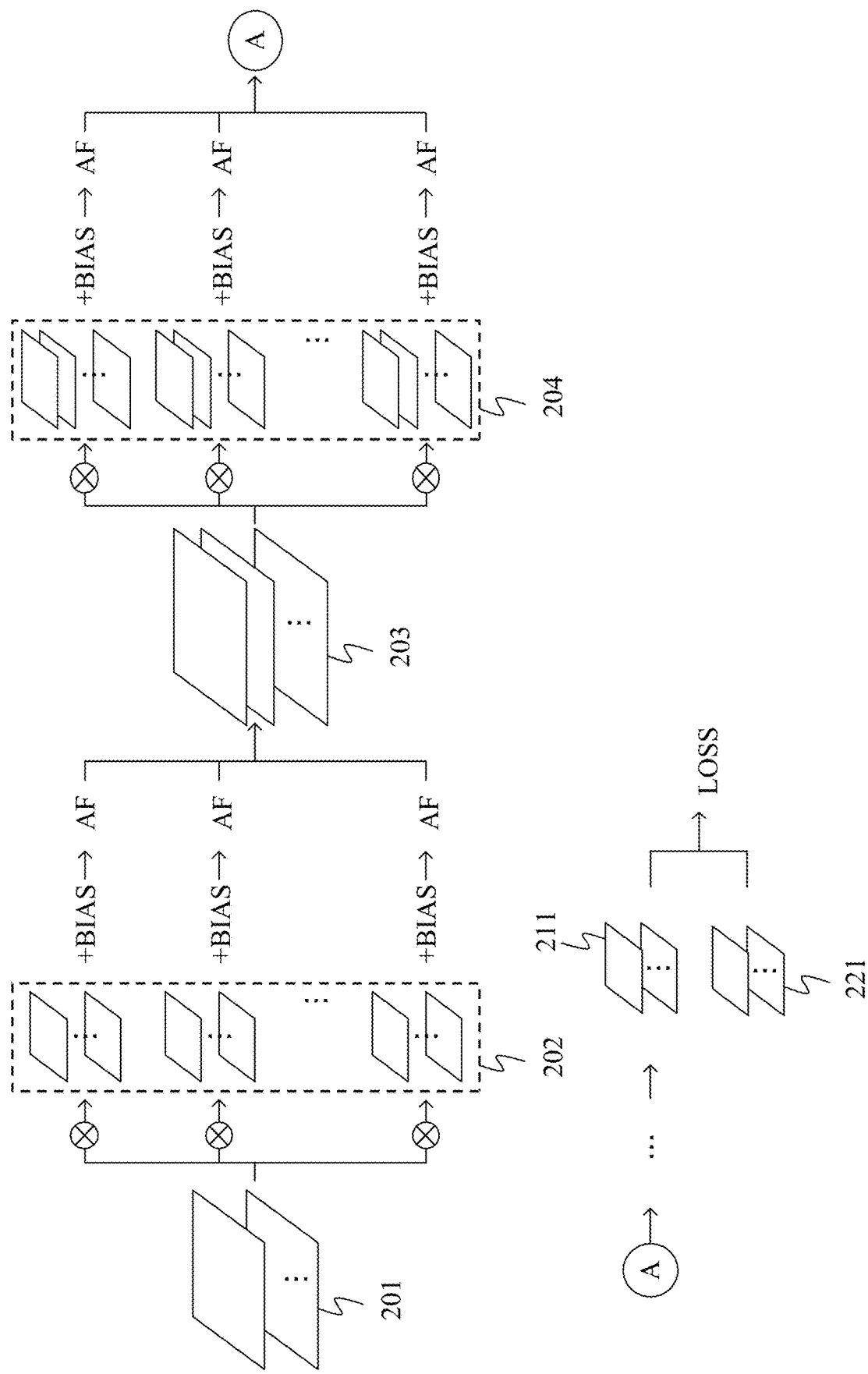
FIG. 7 is a diagram illustrating a convolution neural network according to each embodiment.

Here, with reference to FIG. 7, a description will be given of processing performed by the multilayer neural network. FIG. 7 is a diagram illustrating a convolution neural network (CNN). However, the present embodiment is not limited to this, and, for example, a residual network may be used as the CNN, or GAN (Generative Adversarial Network) or the like may be used. In FIG. 7, for simplification, a single training image 201 to be input is illustrated, but in reality, the output image is generated for each of the selected plurality of training images. The training image 201 is an image in which a RAW image is arranged in a three-dimensional direction for each color component.

FIGS. 8A and 8B are exploratory diagrams relating to the color components of the image. In this embodiment, the training image is an image of a Bayer array as illustrated in FIG. 8A. Here, R, G, and B represent red, green, and blue, respectively. FIG. 8B illustrates a configuration in which components are rearranged for each color from the Bayer array of FIG. 8A. G includes two types, G1 and G2, and those are respectively extracted and arranged. The four-channel image in which the four images of FIG. 8B are arranged in the three-dimensional direction is the training image 201 in FIG. 7. This process is not always necessary, but the aberration and diffraction change depending on the wavelength, and thus when each color component having the same blur are arranged, it is easier to perform deblurring. Further, when R, G, and B are arranged in the same dimension, pixels having different brightness are locally mixed, and therefore estimation accuracy is likely to decrease. Thus, the training image may be separated for each color component. Here, the case of the Bayer arrangement is described, but the same applies to other arrangements such as a honeycomb structure. In a case of monochrome, the rearrangement of the color components may not be performed. This embodiment describes an example of collectively learning and estimating the plurality of color components, but each color may be learnt and estimated individually.

In this embodiment, each of the training image and the ground truth image may include a periodically arranged plurality of color components, and a step may be provided that generates a color component image composed only of each color component of the training image or the ground truth image. In this case, the step of generating the color component image is executed on the training image before the training image is input to the neural network and on the ground truth image before the error is calculated. The CNN has a structure including a plurality of layers, and linear transformation and non-linear transformation are performed in each layer. The linear transformation is represented by the sum of a convolution of the input image (or feature map) and the filter, and the bias (indicated in FIG. 7). The learning phase updates the network parameters (weight and bias of filter) for each layer. The non-linear transformation is a transformation by an activating function (AF in FIG. 7) that is a non-linear function. The activating function is, for example, a sigmoid function or a hyperbolic tangent function, and this embodiment uses ReLU (Rectified Linear Unit) represented by the following expression (1).

$$f(x)=\max(x,0) \tag{1}$$

In the expression (1), max represents a MAX function that outputs a maximum value in arguments.

In a first convolution layer, the sum is taken of a convolution of the training image 201 input to an input layer and each of a plurality of filters 202, and the bias. The number of channels is the same between each of the filters 202 and the training image 201. When the number of channels of the training image 201 is two or more, the filters 202 become three-dimensional filters (the third dimension represents the number of channels). Vertical and horizontal sizes of the filters are arbitrary. A non-linear transformation by the activating function is performed on the result of the sum of each convolution and the bias, and a first feature map 203 is output to a first intermediate layer. The number of channels (the number of arrangements in the three-dimensional direction) of the first feature map 203 is the same as the number of filters 202. Subsequently, the first feature map 203 is input to a second convolution layer, and the sum of a convolution of the first feature map 203 and each of a plurality of filters 204 and a bias is taken in the same manner as described above. The result is non-linearly transformed, and the same process is repeated for the number of convolution layers. In general, deep learning is performed by a CNN having three or more convolution layers. The result output from the last convolution layer is an output image 211 of the CNN. In the last convolution layer, it may not be necessary to perform the non-linear transformation by the activating function.

Subsequently, in step S204, the generator 101c calculates an error between the output image 211 and a ground truth image 221. At this time, this embodiment calculates the error after performing gamma correction on the output image 211 and the ground truth image 221. The gamma correction is, for example, a processing of raising the input signal value to a power, and 1/2.2 or the like is used as an exponent. As in the training image 201, the ground truth image 221 is arranged for each color component and stacked in a channel direction. In this embodiment, the generator 101c calculates an error L using the following expression (2).

$$L=1/2N\Sigma_j^N|g(t_j)-g(y_j)|^2 \tag{2}$$

In the expression (2), t represents a signal value of the ground truth image 221, y represents a signal value of the output image 211, j represents a pixel number, N represents a total number of pixels, and g represents the gamma correction. A Euclidean norm is used in expression (2), but another index may be used as long as the index is a value representing the difference between the ground truth image and the output image. In this embodiment, the error is calculated after the gamma correction is performed on the output image 211 and the ground truth image 221. However, this processing is not essential, and the error may be calculated without the gamma correction.

Subsequently, in step S205, the updater 101d calculates an update amount of the network parameter using the error calculated in step S204, and updates the network parameter. Here, a backpropagation is used. In the backpropagation, the update amount is calculated based on a derivative of the error. However, this embodiment is not limited to this.

Subsequently, in step S206, the updater 101d determines whether or not a predetermined termination condition is satisfied, that is, whether or not optimization of the network parameter is completed. The predetermined termination condition is, for example, when the learning phase reaches a predetermined time, when the parameter is updated for a predetermined number of times, or when a training image and a ground truth image are prepared which are not to be used for parameter update and an error between the output image and the prepared ground truth image is equal to or less than a predetermined value. Alternatively, the user may instruct an end of optimization. When the predetermined termination condition is not satisfied, the process returns to step S203, and the updater 101d acquires a new mini-batch and updates the network parameter. On the other hand, when the predetermined termination condition is satisfied, the process proceeds to step S207.

In step S207, the network parameter updated by the updater 101d is output to the recording medium 105. In this embodiment, since the network parameter is learnt for each piece of different correction intensity information, the network parameter and the corresponding correction intensity information are stored in the recording medium 105 together. According to the above learning phase, even when the correction processing is performed on an image including an area with low optical performance, the multilayer neural network can be acquired which is capable of reducing a possibility of occurrence of the side effect.

Next, with reference to FIG. 9, a description will be given regarding the estimation phase performed by the image estimation apparatus 103. FIG. 9 is a flowchart illustrating the estimation phase.

First, in step S301, the acquirer 103b acquires a captured image from the image pickup apparatus 102 or the recording medium 105. The captured image is an undeveloped RAW image. When the signal value of the RAW image is encoded, the correction unit 103c executes decoding processing. The acquirer 103b acquires the correction intensity information from the image pickup apparatus 102 or the recording medium 105. As described above, the correction intensity information is the parameter associated with a strength of the correction such as "strong" and "weak", and the user can freely select it via a setting in the image pickup apparatus. The correction intensity information may be retained in the captured image as header information of the captured image. In the following description, the header information indicates additional information of the image, and may be footer information. The correction intensity information may not be selected by the user, but may be automatically determined by the image pickup apparatus 102 based on an image pickup scene.

Subsequently, in step S302, the correction unit 103c acquires the network parameter corresponding to the information from the correction intensity information acquired in step S301. The network parameter is read from the memory 101a of the learning apparatus 101. Alternatively, the memory 103a of the image estimation apparatus 103 may store a plurality of network parameters in advance, and the network parameter may be read from the memory 103a. The network parameter is acquired with which correction intensity information acquired in step S301 and the correction intensity information used in the learning phase match each other, or become closest.

Subsequently, in step S303, the correction unit 103c acquires the input image to be input to the CNN from the captured image. As in the training image, the input image is arranged for each color component and stacked in the three-dimensional direction. The size of the input image in the estimation phase may not be necessarily same as the size of the training image in the learning phase.

Subsequently, in step S304, the correction unit 103c generates the estimated image based on the input image and the network parameter. The estimated image is generated using the CNN illustrated in FIG. 7, as in the learning phase. However, the output image 211 in FIG. 7 is the estimated image, and subsequent processing such as the error calculation with the ground truth image is not performed.

Subsequently, in step S305, the correction unit 103c determines whether or not the estimation is completed for a predetermined area of the captured image. When the estimation is not completed, the process returns to step S303, and the correction unit 103c acquires a new input image from the predetermined area of the captured image. In the CNN used for the estimation, when the size of the output image is smaller than the input image, it is necessary to acquire, from the predetermined area, a new input image which overlaps with the previous one. The predetermined area is the whole or part of the captured image. Since the captured image is the RAW image, in addition to the image acquired by receiving light, the captured image may include the header information, that is, information such as the number of pixels of the image and an image pickup time, and optical black information of the image sensor. Since the header information and the optical black have no relation with the blur caused by the aberration or diffraction, those may be excluded from the predetermined area.

Subsequently, in step S306, the correction unit 103c combines the generated plurality of estimated images and outputs a deblurred captured image in which the blur caused by the aberration or diffraction is corrected. If necessary, the correction unit 103c outputs the header information and the optical black information as well.

According to the above estimation phase, even when the estimation processing is performed on a captured image including an image that is significantly deteriorated due to the performance of the optical system, the blur caused by the aberration or diffraction can be corrected while undershoot and ringing are suppressed. After the estimation phase, the user optionally performs editing work such as exposure correction and the like, and acquires a final developed image by development processing. This embodiment has described a method of switching the network parameter based on the correction intensity information to perform the correction. However, the plurality output images may be generated by acquiring a plurality of network parameters and inputting the input image to each network. In this case, it is possible to generate the plurality of output images having different correction intensities. Thereby, an output image having an intermediate correction intensity can be generated by, for example, interpolating the output images. Alternatively, a single piece of correction intensity information may be used, and only a specific network parameter may be stored in the image pickup apparatus 102 or the recording medium 105.

The second image may have different sharpness depending on the image height. In the second image, when the image height is the first image height, the sharpness may be the first sharpness, and when the image height is the second image height higher than the first image height, the sharpness may be the second sharpness lower than the first sharpness.

The second image may have different sharpness depending on the luminance value. In the second image, when the luminance value is a first luminance value, the sharpness may be third sharpness, and when the luminance value is a second luminance value lower than the first luminance value, the sharpness may be a fourth sharpness higher than the third sharpness.

The first image may have a lower sharpness than that of the second image.

The manufacturing method of the learning data may further include a step of acquiring a third image (original image). In a step of generating an image, the second image is generated by blurring the third image. In the step of generating an image, the second image may be generated by blurring processing on the third image in which the blurring amount is made different depending on the optical characteristic of the optical system.

Second Embodiment

Next, a description will be given of an image processing system in a second embodiment of the present invention.

Figure 10:
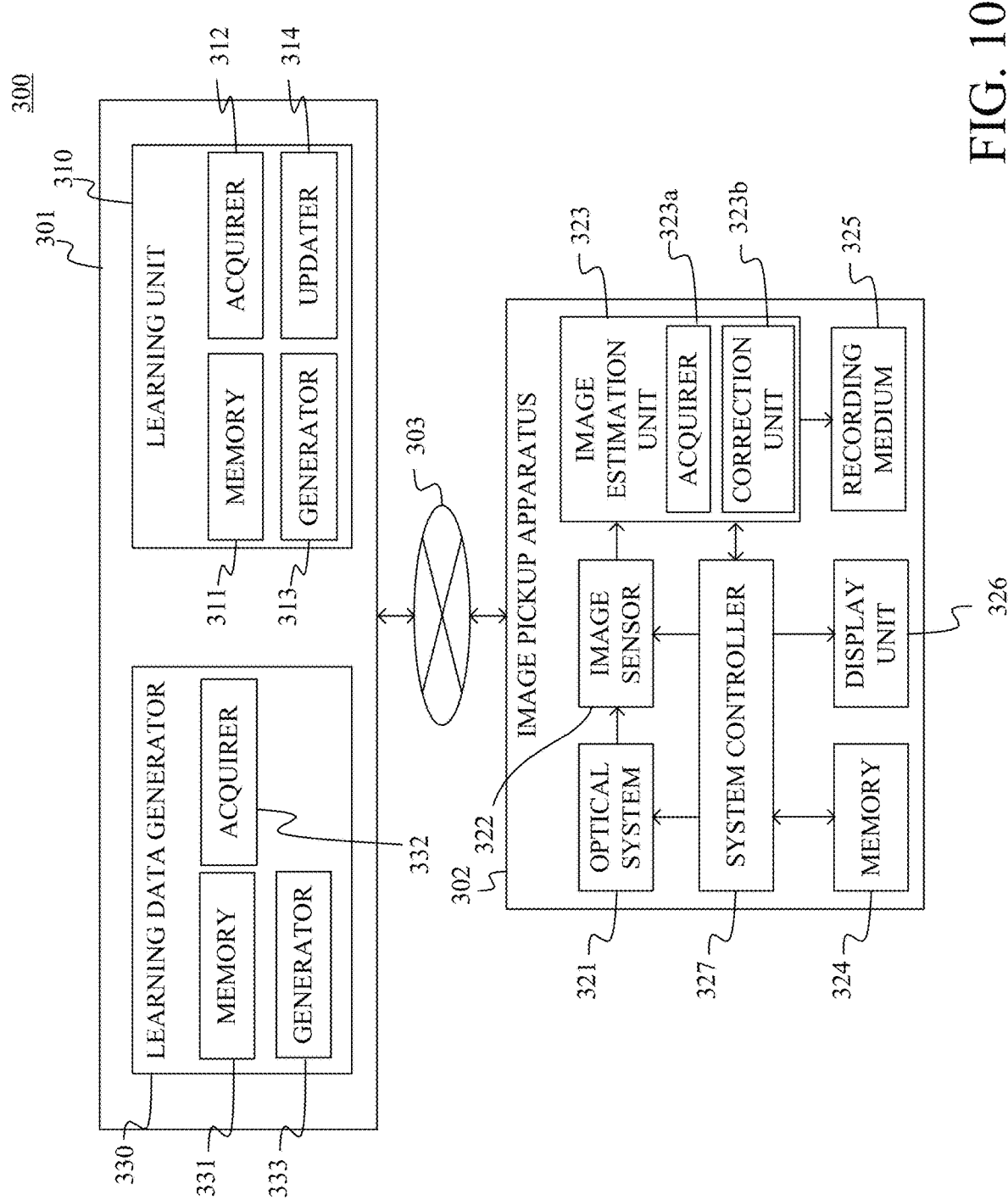
FIG. 10 is a block diagram illustrating an image processing system according to the second embodiment.
Figure 11:
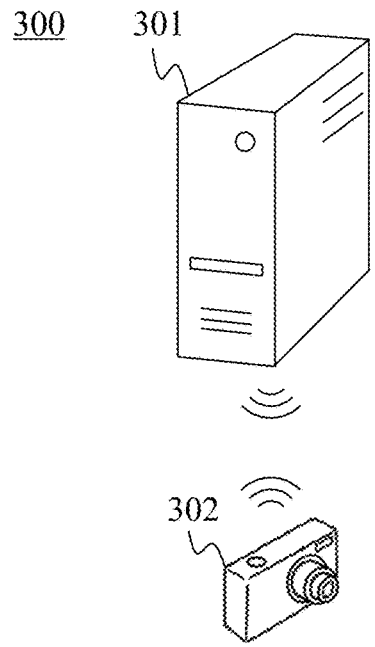
FIG. 11 is an external view illustrating the image processing system according to the second embodiment.

FIG. 10 is a block diagram illustrating an image processing system 300 in this embodiment. FIG. 11 is an external view illustrating the image processing system 300. The image processing system 300 includes a server 301 and an image pickup apparatus 302 which are connected via a network 303.

The server 301 includes a learning unit 310 and a learning data generator 330 as a learning data manufacturing apparatus. The learning unit 310 includes a memory 311, an acquirer 312, a generator 313, and an updater 314, and is configured to make a neural network learn a network parameter for correcting blur caused by an aberration or diffraction. The learning data generator 330 includes a memory 331, an acquirer 332, and a generator 333. The acquirer 332 is configured to acquire an original image and characteristic information on an optical system which is used for generating learning data. The generator 333 is configured to generate a training image and a ground truth image based on the original image. That is, the generator 333 has functions as an acquisition unit for acquiring the training image and a generation unit for generating the ground truth image having an optical characteristic different from that of the training image. The training image and the ground truth image generated by the generator 333 are stored in the memory 331.

The image pickup apparatus 302 is configured to capture an image of an object space to acquire the captured image, and to use the read network parameter to correct blur caused by the aberration or diffraction in the captured image. The image pickup apparatus 302 includes an optical system 321 and an image sensor 322. The image estimation unit 323 includes an acquirer 323a and an estimation unit 323b, and is configured to use the network parameter stored in the memory 324 and to perform correction on the captured image. The network parameter is learnt in advance by the learning unit 310 and stored in the memory 311. The image pickup apparatus 302 is configured to read the network parameter from the memory 311 via the network 303 and to store it in the memory 324. The recording medium 325 is configured to store a deblurred captured image (output image) in which blur caused by the aberration or diffraction is corrected. When a user gives an instruction regarding display of the output image, the stored output image is read out and displayed on a display unit 326. A captured image stored in the recording medium 325 in advance may be read out and deblurred by the image estimation unit 323. The system controller 327 is configured to perform the above series of control.

Figure 12:
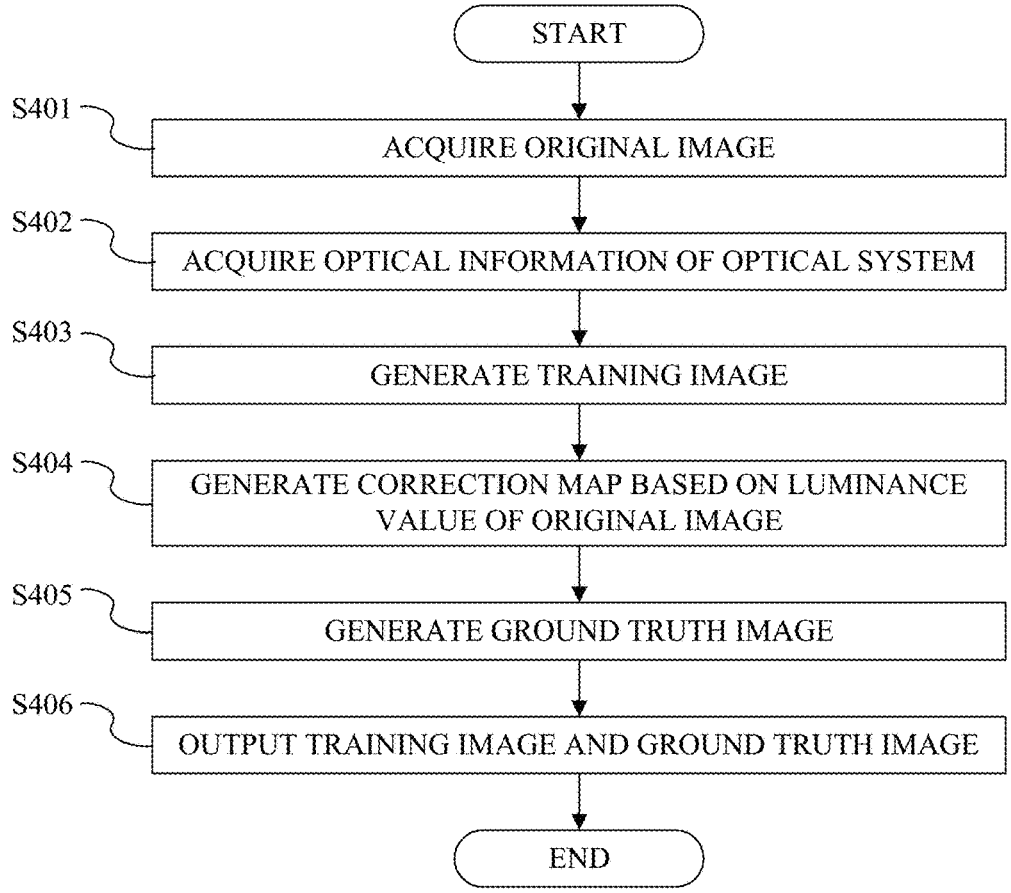
FIG. 12 is a flowchart illustrating a manufacturing method of learning data according to the second embodiment.

Next, a description will be given of a learning data generation processing executed by the learning data generator 330 with reference to FIG. 12. FIG. 12 is a flowchart illustrating the learning data generation processing. Each step of FIG. 12 is executed by each part (memory 331, acquirer 332, and generator 333) of the learning data generator 330.

In the first embodiment, for the area where the optical performance of the optical system is low, the original image is blurred when the ground truth image is generated. Thereby, in the area where the optical performance is low, the difference between the training image and the ground truth image is made small, and in the area where the optical performance is high, the difference is maintained between the training image and the ground truth image. As a result, the learning data is generated with which the possibility is reduced of occurrence of the side effect. On the other hand, this embodiment focuses on a luminance value of the image, and a description will be given of a manufacturing method of the learning data for reducing possibility of occurrence of the side effect such as undershoot and ringing, each of which occurs in the vicinity of high luminance part.

Steps S401, S402, and S403 of FIG. 12 are the same processing as that in steps S101, S102, and S103 of FIG. 1, and thus a description thereof will be omitted. When information on a luminance saturation value of the image sensor 322 is used in step S404, the acquirer 332 may acquire the information on the luminance saturation value from the image pickup apparatus 302 in step S401 or step S402. Alternatively, the information on the luminance saturation value may be acquired from header information of an original image acquired in step S401.

Figure 13A:
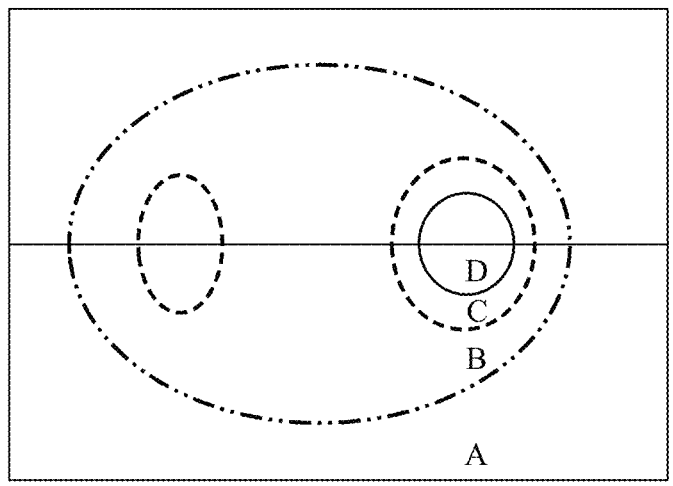
FIGS. 13A and 13B are exploratory diagrams relating to a correction map according to the second embodiment.
Figure 13B:
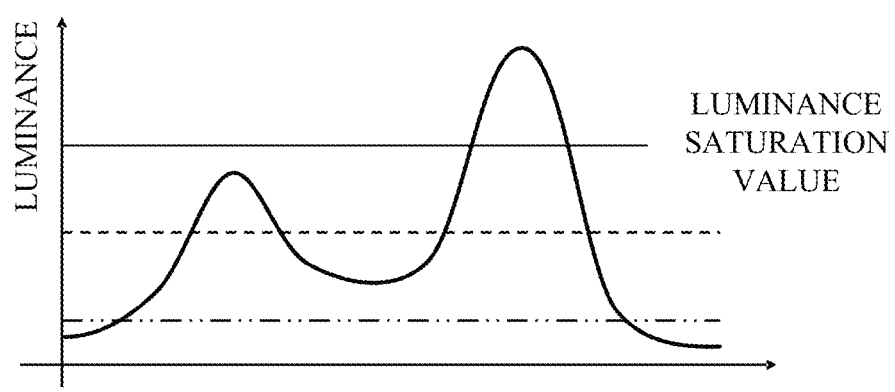

Next, in step S404, a correction map is generated which is used for generating the ground truth image. FIG. 13A is a diagram illustrating the correction map in this embodiment. In the correction map, the original image is divided into four areas of A, B, C, and D based on the luminance value. In FIG. 13A, an area inside a solid line represents a D area, an area inside a broken line excluding the D area is a C area, an area inside a two-dot chain line excluding the D area and C area is a B area, and an area outside the two-dot chain line is an A area. FIG. 13B is a cross-sectional view of the original image and corresponds to a thick solid line of FIG. 13A. A solid line, broken line, and two-dot chain line in FIG. 13B correspond to the solid line, broken line, and two-dot chain line in FIG. 13A, respectively. In this embodiment, the D area is an area with a luminance value equal to or higher than the luminance saturation value of the image sensor 322, the C area is an area with a luminance value of 60% or more of and less than the luminance saturation value, the B area is an area with a luminance value of 20% or more and less than 60% of the luminance saturation value, and the A area is an area with a luminance value of less than 20% of the luminance saturation value. In this embodiment, the correction map is divided into four areas based on the luminance value as illustrated in FIG. 13A, but the number of areas may be increased or decreased. In this embodiment, an index is divided into steps, but the index value may be used as it is as the correction map or as a continuous value.

Subsequently, in step S405, the ground truth image is generated based on the correction map generated in step S404. In the correction map of FIG. 13A, the A area has the low luminance value and the side effect is unlikely to occur, and thus the ground truth image corresponding to this area uses the original image as it is without adding blur. Thereby, the correction amount can be maintained by maintaining the difference between the training image and the ground truth image for the high-performance area where the possibility of the occurrence of the side effect is originally low.

Regarding the B area, the luminance is higher than that of the A area and is lower than that of the C area, and thus blur is slightly added to the original image. For example, the ground truth image is generated by adding a reduced PSF to the original image, the reduced PSF being generated by reducing a PSF corresponding to each pixel to 20%. Subsequently, the C area has the luminance higher than the B area, the blurring amount is further increased. For example, the ground truth image is generated by adding a reduced PSF to the original image, the reduced PSF being generated by reducing the PSF given to the training image to 50%. The D area has the highest luminance, and thus the ground truth image is generated by blurring the original image with the PSF added to the training image, the PSF not being reduced. In other words, in the ground truth image, when the luminance value is a first luminance value, the sharpness is third sharpness (third blur amount), and when the luminance value is a second luminance value lower than the first luminance value, the sharpness is fourth sharpness higher than the third sharpness (fourth blur amount smaller than the third blur amount).

The reduction amount of the PSF for the correction map described above is an example, and is not limited to this. The A area is described as the area where blur is not added, but blur may be added to the entire area. However, a blurring amount added to the ground truth image needs be equal to or less than a blurring amount when the training image is generated. That is, the training image has a lower sharpness (a larger blur amount) than that of the ground truth image. Therefore, when blur is added to the ground truth image, a PSF is used which is equal to or less than the PSF used when the training image is generated. When the training image is reduced after the blurring during the generation of the training image in step S403, the ground truth image is also reduced by the same magnification. At this time, when the original image has a signal value higher than the luminance saturation value of the image sensor 322, the signal is clipped at the luminance saturation value of the image sensor 322.

Subsequently, in step S406, a pair of the training image generated in step S403 and the ground truth image generated in step S405 is stored in the memory 331 as the learning data. Step S406 is the same as step S106, and therefore detailed description thereof will be omitted.

In this embodiment, the learning unit 310 executes the learning phase, and the image estimation unit 323 executes the estimation phase. For the learning phase in this embodiment, the learning data (ground truth image and training image) generated in the flow of FIG. 12 is used. The other contents are the same as the flowchart illustrated in FIG. 6 of the first embodiment, and thus the details will be omitted. The estimation phase is the same processing as that illustrated in the flowchart in FIG. 9 of the first embodiment, and thus the description thereof will be omitted.

As described above, the correction map is generated based on the luminance value and the ground truth image is generated based on the correction map. Thereby, it is possible to manufacture the learning data that can reduce the possibility of occurrence of the side effect such as undershoot and ringing each of which occurs in the vicinity of the high luminance part. The network parameter is generated by using the learning data generated in this way and the estimation processing is executed by using the information on the network parameter. As a result, even when the captured image includes the high luminance part, the blur caused by the aberration or diffraction can be corrected with high accuracy while the possibility of occurrence of the side effect is reduced. In this embodiment, the correction map is divided into four parts, but may be divided into two parts, a luminance-saturated part and part other than the luminance-saturated part. For example, when, for the luminance-saturated part, the ground truth image is generated by blurring the original image with the PSF added to the training image, the difference disappears between the training image and the ground truth image for the luminance-saturated part. When the network performs learning by using this learning data and the estimation processing is executed by using the network parameter, processing can be realized in which areas other than the luminance-saturated part is deblurred while the luminance-saturated part is not deblurred. In particular, in the captured image, the luminance-saturated part is an area in which information is missing, and if the deblurring is performed as in other areas, the side effect is likely to occur. By performing learning as described above, a network can output an estimated image with high quality. In this embodiment, the correction map is generated by using the luminance value of the original image, but the correction map may be generated based on a variation in the luminance value. In this case, a differential image can be generated by applying a differential filter, a Prewitt filter, or a Sobel filter to the original image. Alternatively, a second-order differentiated image may be generated using a Laplacian filter or the like. When the correction map is generated based on the variation in the luminance in this way, it is possible to generate learning data capable of suppressing the side effect occurring in the vicinity of the edge having high contrast.

The first embodiment has described the generation of the correction map based on the performance, and this embodiment has described the generation of the correction map based on the luminance of the image, but both may be performed. In this case, in step S404, not only the correction map based on the luminance, but also a correction map based on the optical information of the optical system are generated, and these two correction maps are integrated. For example, when the correction maps of FIG. 5 and FIG. 13A are integrated, the integrated map is a map which adds larger blur in the correction maps. That is, a method is used which sets, as the D area, an area that is the B area in FIG. 5 and is the D area in FIG. 13A. Alternatively, a correction map may be generated by integrating each average value of the reduction ratio of the PSF in each correction map. The method of integration is not limited to these methods, and an integrated correction map may be generated by using another method. By using the two correction maps, learning data can be generated which takes account of both effects of the performance of the optical system and the luminance value of the image.

Third Embodiment

Next, a description will be given of an image processing system in a third embodiment of the present invention. Configurations of the image processing system and learning processing in this embodiment are the same as those of the first embodiment, and learning data generation processing (manufacturing method of learning data) and estimation processing are different from those of the first embodiment.

Figure 14:
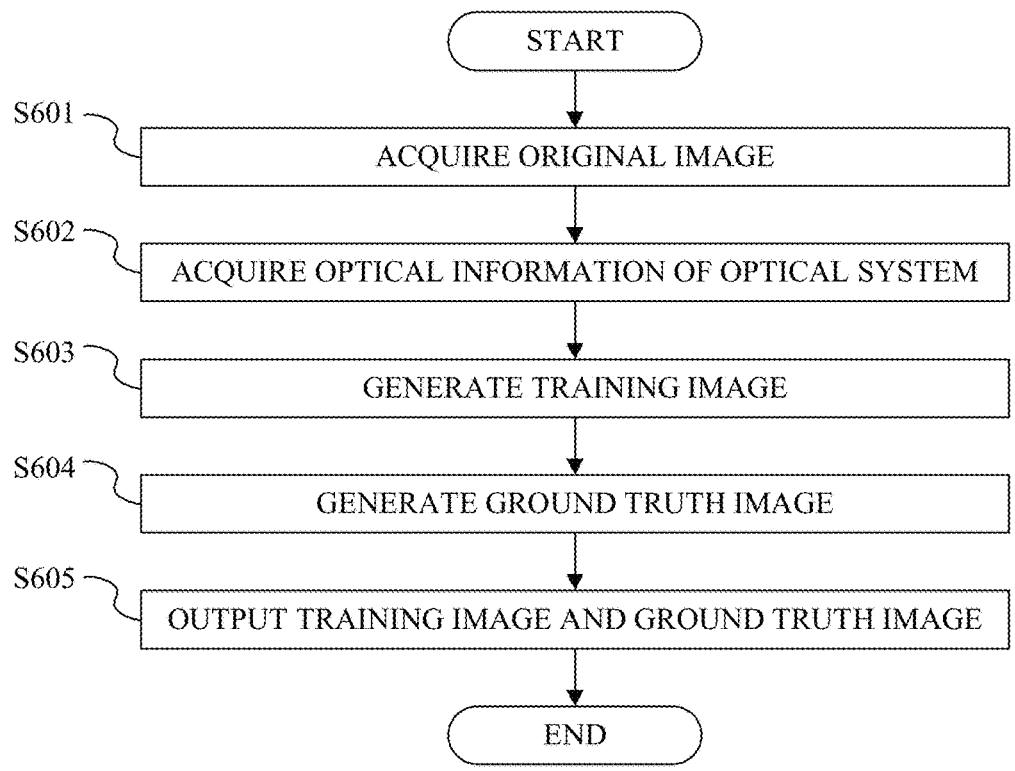
FIG. 14 is a flowchart illustrating a manufacturing method of learning data according to the third embodiment.

A description will be given of the manufacturing method of the learning data executed in this embodiment, with reference to FIG. 14. FIG. 14 is a flowchart illustrating the manufacturing method of the learning data.

In the first embodiment, the correction map is generated and the ground truth image is generated based on the correction map. However, in this embodiment, a ground truth image and a training image are generated by not using a correction map. In this embodiment, correction amounts for the ground truth image and the training image for the original image are constant in an image. Since steps S601 and S602 are the same processing as steps S101 and S102 of the first embodiment, respectively, a description thereof will be omitted.

In step S603, the generator 108c generates the training image (first image) using optical information acquired in step S602. The training image in this embodiment is, for example, an image (image corresponding to part of image height) acquired by extracting only part of an image (image corresponding to an entire angle of view of the optical system) acquired by image pickup using an optical system. The first embodiment has described a method of linearly interpolating the PSF in order to make the PSF different for each pixel position, but this embodiment adds uniform blur without changing the PSF based on the pixel position. In order to deal with fluctuation of optical performance (optical information) depending on the image height, this embodiment increases the number of the ground truth images and the training images to be generated, by increasing the number of the original images. When it is necessary to deal with a plurality of lens states, image heights, and azimuths at the time of estimation, these are mixed and used to generate the pair of the ground truth image and the training image.

Subsequently, in step S604, the generator 108c generates the ground truth image (second image) to be paired with the training image generated in step S603. The ground truth image in this embodiment corresponds to, for example, an image (image corresponding to part of the image height) acquired by extracting only part of an image (image corresponding to the entire angle of view of the optical system) acquired by image pickup using the optical system. The area of the original image extracted as the ground truth image may be equivalent to the training image to be paired. In this embodiment, the ground truth image is generated by using a peak value of the PSF as the performance of the optical system. The higher the performance of the optical system, the higher the peak value of the PSF, and the lower the performance, the lower the peak value. Thus, the peak value is suitable as an index used when the ground truth image is generated from the original image. As in the second embodiment, the ground truth image may be generated based on the presence or absence of a luminance-saturated part instead of the optical performance.

Figure 15:
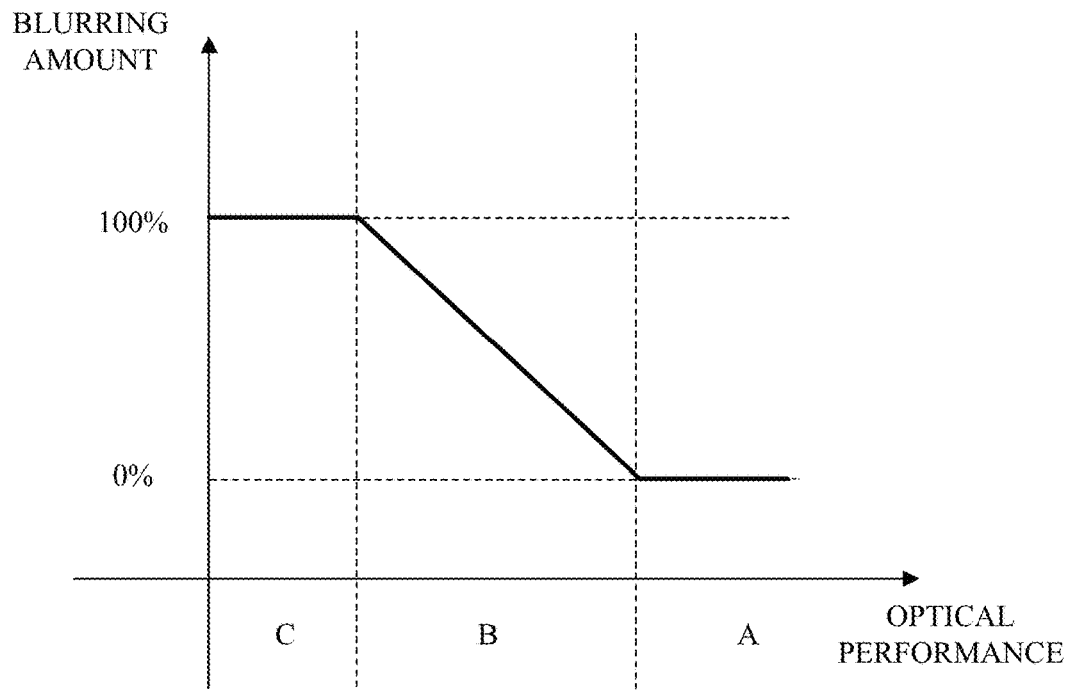
FIG. 15 is an exploratory diagram illustrating optical performance and blurring amount according to the third embodiment.

FIG. 15 is a diagram illustrating a relationship between the performance of the optical system (optical performance) and a blurring amount of the PSF added to the original image for generating the ground truth image, is divided into three areas (sections A, B, and C) based on the performance of the optical system. In this embodiment, a horizontal axis of FIG. 15 represents the optical performance corresponding to the peak value of the PSF. When the section A includes the optical performance, it can be considered that the peak value of the PSF is high and the performance of the optical system is sufficiently exercised. When the section A includes optical performance of an area of the original image extracted as the ground truth image, the original image is used as it is as the ground truth image. In this case, the optical performance is high and the possibility of occurrence of the side effect is low, and therefore the difference between the training image and the ground truth image is maintained. Thereby, learning is performed so that, when the optical performance is included in the section A, the correction amount for the training image (input image) becomes relatively large.

When the section B includes optical performance of an area of the original image extracted as the ground truth image, the blurring amount of the PSF is changed based on the peak value of the PSF. As illustrated in FIG. 15, when the peak value of the PSF is high, the blurring amount given to the original image is small. On the other hand, when the peak value is low, the blurring amount is adjusted to be large. The change in the section B of FIG. 15 is represented by a straight line, but the change is not limited to this and may be represented by a non-linear function such as a quadratic function and an exponential function.

The section C is an area having the lowest performance of the optical system. When the section C includes optical performance of an area of the original image extracted as the ground truth image, the ground truth image is generated by using the PSF as it is, the PSF being used when the training image is generated. That is, the training image and the ground truth image are generated by the same method. When the optical performance is low as in section C, the side effect is more likely to occur. Thus, a deblurring effect on the training image (input image) given by learning is suppressed by matching the training image with the ground truth image. This makes it possible to suppress the side effect. In such manner, the blurring amount is adjusted based on the performance of the optical system when the ground truth image is generated from the original image. Thereby, under a condition that the side effect is unlikely to occur, the deblurring effect can be increased. On the other hand, under a condition that the side effect is likely to occur, the deblurring effect is suppressed, and the side effect suppression can be prioritized.

The peak value of the PSF was used as the index for adjustment of the blurring amount, but a frequency characteristic may be used as the index. In this case, an OTF is generated by Fourier transform on the PSF, and an MTF is calculated by taking an absolute value of the OTF. When the MTF is used as the index, the MTF value at a specific frequency (for example, the MTF value at half of a Nyquist frequency) may be used, or an integrated value (integrated value up to the Nyquist frequency) or an average value of a certain section may be used. Blur asymmetry may be used as another index, or the asymmetry may be quantified and the blurring amount may be adjusted based on the numerical value. Basically, there is a tendency that the more asymmetric the PSF is, the more likely the side effect to occur. As a method for quantifying the asymmetry, for example, a method is used in which LSFs are calculated for two cross sections orthogonal to each other such as a meridional direction and a sagittal direction from the PSF, and a difference between peak values of the two LSFs is used as the index. In this case, the larger the difference between the peak values, the more asymmetric the shape, and thus the blurring amount is increased. On the other hand, as the difference becomes smaller, the blurring amount is decreased. The frequency characteristic may be used for evaluation instead of the LSF, and an average value of MTF characteristics in the meridional direction and the sagittal direction or a difference value at a specific frequency may be used as an index of the asymmetry. Alternatively, skewness of the PSF may be used. The larger an absolute value of the skewness, the higher the asymmetry, and thus the blurring amount is increased. On the other hand, the smaller the absolute value, the smaller the asymmetry, and thus the blurring amount may be decreased. As a simpler index for adjusting the amount of blurring, the image height corresponding to the ground truth image (position of the ground truth image in the image corresponding to the entire angle of view of the optical system) may be used. As described in the first embodiment, in general, there is a correlation that the optical performance decreases as the image height increases.

When the high frequency component of the original image is insufficient, the original image may be reduced at the time of generation of the ground truth image. In this case, the training image is also reduced in the same manner.

Subsequently, in step S605, the pair of the training image generated in step S603 and the ground truth image generated in step S604 is stored in the memory 108a as the learning data.

A description has been given of the manufacturing method of the learning data in this embodiment. When learning uses the ground truth image and training image generated in this way, it is possible to generate the learning model for realizing highly accurate correction while the possibility of occurrence of the side effect is reduced.

Figure 16:
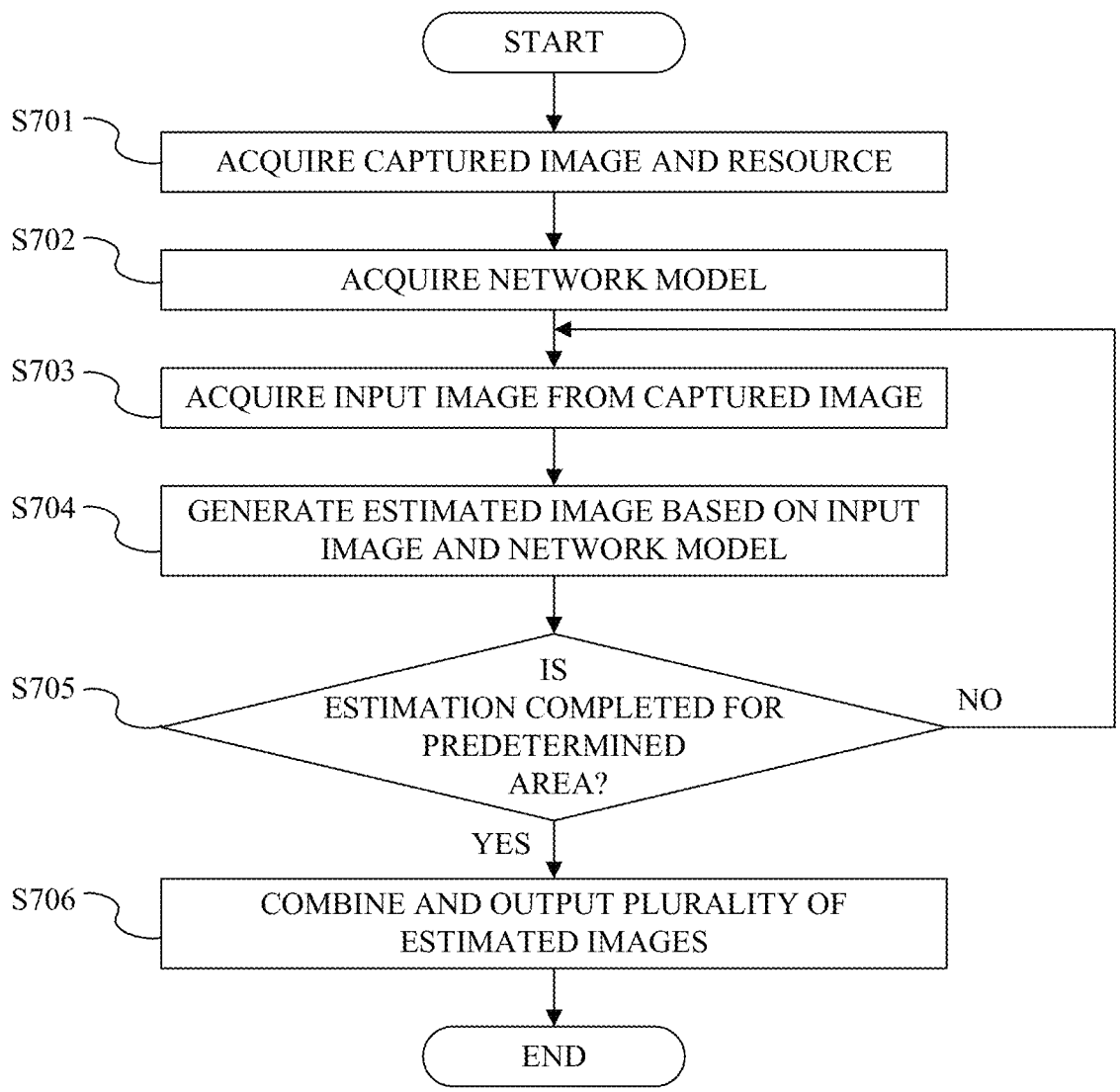
FIG. 16 is a flowchart illustrating estimation processing according to the third embodiment.

Next, with reference to FIG. 16, a description will be given of the estimation phase executed by the image estimation apparatus 103. FIG. 16 is a flowchart illustrating the estimation phase.

The first embodiment has described a method of acquiring a network parameter based on the correction intensity information. This embodiment will describe a method of acquiring a network model based on resource information of the image estimation apparatus 103. In this embodiment, the network model includes the network parameter and a network configuration (architecture). As described in the first embodiment, the size of the input image input to the CNN may be different from that at the time of learning. When part of an area of the captured image is used as the input image, the output estimated image may be combined to generate a deblurred captured image. When the estimation processing is performed in this way, the estimation processing can be executed at a higher speed by increasing size of the input image to reduce the number of divisions of the captured image. However, as the size is increased, a used amount of a memory (RAM) increases accordingly. If the memory capacity of the image estimation apparatus is exceeded, the processing speed may decrease or the processing may end abnormally. That is, in order to perform processing more efficiently, it is better to set an input size depending on the image estimation apparatus, and an example thereof will be described here.

First, in step S701, the acquirer 103b acquires the captured image from the image pickup apparatus 102 or the recording medium 105. The captured image is an undeveloped RAW image. When a signal value of the RAW image is encoded, the correction unit 103c executes decoding processing. The acquirer 103b acquires memory information (resource information) of the image processing apparatus. The memory information to be acquired may be information on a capacity of a physical memory, but information on a free capacity may be acquired because an available capacity changes depending on other processing. When an effect of other processing is small, the information on the capacity of the physical memory may be acquired, or the available memory capacity may be estimated from the physical memory and a memory capacity in use.

Subsequently, in step S702, the correction unit 103c acquires a suitable network model based on the memory information acquired in step S701. In a case of a network model in which size of the input image is fixed, it is necessary to select a suitable network model. For example, when the free capacity of the memory acquired in step S701 is sufficiently larger than the memory capacity used by the CNN, the correction unit 103c acquires a network model having a large input image size. On the other hand, when the free capacity is small, the correction unit 103c acquires a network model having a small input image size. Since the network parameter does not need to be changed, the correction unit 103c may acquire only the network configuration based on the memory information. The network models include various formats, but when the input image size is fixed, the correction processing can be efficiently executed by switching the network model in this way. In a case of a network model in which the input image size is variable, it is not necessary to change the network model, and a proper value may be set only for the input image size. The selection of two network models has been described, but when the variation of the network model is increased, it becomes possible to select a network model more suitable for the image processing apparatus. The network model may be selected not only based on an automatic determination from the memory information, but also based on input information by the user. For example, the user can select a high-performance mode and a lightweight mode, and at a time of selection of the network model, selected mode information is also taken into account, so that the processing desired by the user can be realized.

Since steps S703 and subsequent steps are the same as those of steps S303 and subsequent steps of the first embodiment, detailed description thereof will be omitted.

The description has been given of the estimation phase in this embodiment. The network model and the configuration are acquired based on the memory information of the image processing apparatus, and thereby it is possible to realize the estimation processing suitable for a processing environment.

In this embodiment, the training image and the ground truth image correspond to part of the image height in the image corresponding to the entire angle of view of the optical system. In this case, at the time of learning, in addition to the training image, information on the image height of the training image may be input to the neural network and learnt. This makes it possible to more accurately learn the correction amount for the position in the image corresponding to the entire angle of view of the optical system. When the information on the image height of the training image is input to the neural network for learning, the information on the image height of the input image is input to the neural network as in the learning in the estimation phase.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can provide a manufacturing method of learning data and the like each of which can realize highly accurate correction while reducing a possibility of an occurrence of a side effect even when an image input to a neural network includes an object of high luminance or an object that is greatly blurred due to an aberration of an optical system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2020-040026, filed on Mar. 9, 2020, and 2021-003864, filed on Jan. 14, 2021, each of which is hereby incorporated by reference herein in its entirety.

What is claimed is:

1. A manufacturing method of learning data used for making a neural network perform learning, the manufacturing method of learning data comprising:
    a first acquiring step configured to acquire an original image;
    a second acquiring step configured to acquire a first image as a training image generated by adding first blur to the original image; and
    a third acquiring step configured to acquire a second image as a ground truth image generated by adding second blur to the original image,
    wherein an amount of the second blur added to the original image is smaller than an amount of the first blur added to the original image, and
    wherein the first blur and the second blur are acquired based on the same optical information.

2. The manufacturing method of learning data according to claim 1, further comprising a fourth acquiring step configured to acquire the optical information,
    wherein the optical information is a plurality of pieces of optical information each of which is different depending on an image height,
    wherein the second acquiring step acquires the first image generated by adding the first blur using the plurality of pieces of optical information, and wherein the third acquiring step acquires the second image generated by adding the second blur using the plurality of pieces of optical information.

3. The manufacturing method of learning data according to claim 1,
wherein the second image is generated by adding the second blur to the original image, the second blur having a different amount depending on an image height.

4. The manufacturing method of learning data according to claim 3,
wherein the second image is generated by adding the second blur with a third blur amount to a first image height of the original image, and by adding the second blur with a fourth blur amount larger than the third blur amount to a second image height higher than the first image height of the original image.

5. The manufacturing method of learning data according to claim 1, further comprising a fourth acquiring step configured to acquire the optical information,
wherein the optical information is a plurality of pieces of optical information each of which is different depending on an image height,
wherein the second acquiring step acquires the first image which is generated by adding the first blur using optical information corresponding to an image height corresponding to the first image among the plurality of pieces of optical information, and
wherein the third acquiring step acquires the second image which is generated by adding the second blur using optical information corresponding to an image height corresponding to the second image among the plurality of pieces of optical information.

6. The manufacturing method of learning data according to claim 1,
wherein the amount of the second blur is acquired based on a luminance value.

7. The manufacturing method of learning data according to claim 6,
wherein when the luminance value is a first luminance value, the second image is generated by adding the second blur with a third blur amount to the original image, and
wherein when the luminance value is a second luminance value lower than the first luminance value, the second image is generated by adding the second blur with a fourth blur amount larger than the third blur amount to the original image.

8. A learning method that makes a neural network perform learning using learning data generated by the manufacturing method of learning data according to claim 1, the learning method comprising steps of:
generating a processed image by inputting the first image as the training image into the neural network; and
updating the neural network based on the second image and the processed image.

9. A non-transitory computer-readable storage medium storing a computer program that causes a computer to execute the manufacturing method of learning data according to claim 1.

10. A manufacturing method of learnt model that manufactures a learnt model by making a neural network perform learning using learning data generated by the manufacturing method of learning data according to claim 1, the manufacturing method of learnt model comprising steps of:
generating a processed image by inputting the first image as the training image into the neural network; and
making the neural network perform learning based on the second image and the processed image.

11. An image processing method comprising steps of:
acquiring the neural network obtained by the manufacturing method according to claim 10;
generating an estimated image by inputting an input image into the neural network.

12. The image processing method according to claim 11,
wherein the input image is an image obtained by image pickup, and
wherein the estimated image is generated by correcting blur in the input image generated in the image pickup by the neural network.

13. A non-transitory computer-readable storage medium storing a computer program that causes a computer to execute the image processing method according to claim 11.

14. An image processing apparatus comprising at least one processor or circuit configured to execute a plurality of tasks including:
an acquisition task configured to acquire the neural network obtained by the manufacturing method according to claim 10; and
a generation task configured to estimate an estimated image by inputting an input image into the neural network.

15. A learning data manufacturing apparatus which manufactures learning data used for learning of a neural network, the learning data manufacturing apparatus comprising at least one processor or circuit configured to execute a plurality of tasks including:
a first acquisition task configured to acquire an original image;
a second acquisition task configured to acquire a first image generated by adding first blur to the original image; and
a third acquisition task configured to acquire a second image generated by adding second blur to the original image,
wherein an amount of the second blur added to the original image is smaller than an amount of the first blur added to the original image, and
wherein the first blur and the second blur are acquired based on the same optical information.

16. A learning apparatus comprising:
the learning data manufacturing apparatus according to claim 15; and
at least one processor or circuit configured to execute a plurality of tasks including:
a generation task configured to generate a processed image by inputting the first image as the training image to a neural network; and
an update task configured to update the neural network based on the second image and the processed image.

* * * * *